United States Patent [19]

Washizu

[11] Patent Number: 5,160,177
[45] Date of Patent: Nov. 3, 1992

[54] CONNECTOR FOR CONNECTING SLENDER PIPING MEMBERS WITH CANTILEVER MECHANISM
[75] Inventor: Katsushi Washizu, Numazu, Japan
[73] Assignee: Usui Kokusai Sangyo Kaisha Limited, Japan
[21] Appl. No.: 637,459
[22] Filed: Jan. 4, 1991
[30] Foreign Application Priority Data
Jan. 20, 1990 [JP] Japan .................... 2-11490
[51] Int. Cl.⁵ ............................................. F16L 37/00
[52] U.S. Cl. .................................. 285/319; 285/320; 285/351; 285/379; 285/921; 285/312
[58] Field of Search ............... 285/319, 320, 351, 379, 285/921, 312

[56] References Cited

U.S. PATENT DOCUMENTS

| | | | |
|---|---|---|---|
| 2,892,991 | 6/1959 | Beebee et al. | 285/91 |
| 3,169,030 | 2/1965 | Lippincott | 285/86 |
| 3,453,005 | 7/1969 | Foults | 285/82 |
| 3,826,523 | 7/1974 | Eschbaugh | 285/39 |
| 3,933,378 | 1/1976 | Sandford et al. | 285/319 |
| 4,026,581 | 5/1977 | Pasbrig | 285/24 |
| 4,035,005 | 7/1977 | De Vincent et al. | 285/319 |
| 4,074,912 | 2/1978 | Van Bilderbeek et al. | 285/39 |
| 4,219,222 | 8/1980 | Brusadin | 285/8 |
| 4,275,907 | 6/1981 | Hunt | 285/18 |
| 4,451,069 | 5/1984 | Melone | 285/86 |
| 4,601,497 | 7/1986 | Bartholomew | 285/319 |
| 4,637,636 | 1/1987 | Guest | 285/38 |
| 4,637,640 | 1/1987 | Fournier et al. | 285/319 |
| 4,673,199 | 6/1987 | Renfrew | 285/316 |
| 4,681,351 | 7/1987 | Bartholomew | 285/319 |
| 4,730,856 | 3/1988 | Washizu | 285/319 |
| 4,749,214 | 6/1988 | Hoskins et al. | 285/4 |
| 4,753,458 | 6/1988 | Case et al. | 285/93 |
| 4,776,616 | 10/1988 | Umehara et al. | 285/156 |
| 4,778,203 | 10/1988 | Bartholomew | 285/111 |
| 4,781,400 | 11/1988 | Cunningham | 285/39 |
| 4,793,637 | 12/1988 | Laipply et al. | 285/39 |
| 4,895,396 | 1/1990 | Washizu | 285/93 |
| 4,913,467 | 4/1990 | Washizu | 285/39 |
| 4,915,420 | 4/1990 | Washizu | 285/39 |
| 4,944,537 | 7/1990 | Usui et al. | 285/319 |
| 4,946,205 | 8/1990 | Washizu | 285/319 |
| 4,948,180 | 8/1990 | Usui et al. | 285/319 |
| 4,964,658 | 10/1990 | Usui et al. | 285/319 |

FOREIGN PATENT DOCUMENTS 59341 5/1959 Italy .
855603 12/1960 United Kingdom .

Primary Examiner—Randolph A. Reese
Assistant Examiner—Timothy Aberle
Attorney, Agent, or Firm—Anthony J. Casella; Gerald E. Hespos

[57] ABSTRACT

Herein disclosed is a connector for connecting slender piping members. The connector comprises: a connector body and a separate socket body. The connector body is formed axially therethrough with a stepped smaller-diameter chamber, which is expanded to lead to a communication hole formed in a connecting cylindrical wall at the leading end, and a stepped larger-diameter chamber which is positioned at the back of the smaller-diameter chamber. The connector body is further formed with a pair of engagement holes or slots opposed to the circumferential wall of the larger-diameter chamber to form a retaining wall at the circumference of the rear end. The connector body has seal ring members at the side of the smaller-diameter chamber and a bushing member at the back of the seal ring members. The separate socket body has a pair of elastic pawl walls projected from the circumferential wall of the axial through hole in the larger-diameter chamber and inclined forward opposed to the front portion of the assembly direction. The socket body has its rear end annular circumference retained on the retaining wall. The piping member is formed in the vicinity of its connecting end with an annular ridged wall which is retained elastically by the leading ends of the elastic pawl walls when the piping member is in its connected state. The socket body includes: a cylindrical wall forming the root of the elastic pawl walls; cut-away apertures formed in positions opposed to the engagement holes in the vicinity of the intermediate portion of the cylindrical wall; tongue-shaped walls positioned in the cut-away apertures and leading integrally to the elastic pawl walls and the leading end of the cylindrical wall; and a stepped engagement groove formed backward and having its rear end on the retaining wall.

6 Claims, 2 Drawing Sheets

PRIOR ART

CONNECTOR FOR CONNECTING SLENDER PIPING MEMBERS WITH CANTILEVER MECHANISM

BACKGROUND OF THE INVENTION

1. Field of the Invention

The present invention relates generally to an improvement in the structure of a connector for connecting slender piping members such as metal pipes or resin tubes (as will be shortly referred to as the "piping members"), which are so slender as to have a diameter of about 20 mm or less and are used to supply oil or air to various machines or apparatus such as automobiles.

2. Description of the Prior Art

The connector of this kind according to the prior art will be reviewed in the following with reference to FIG. 6. A connector body 21 is formed with a retaining wall 21' at its rear end circumference. A socket 22 is formed with a pair of pawl walls 23 which are projected from the circumferential wall of an axial through hole and inclined forward in front of the assembly direction. A piping member $P_o$ is fitted into the socket body 22 and is connected by retaining a stepped portion 24 on an annular circumference 23' at the leading end to retain the ridged wall $P_o'$ of the piping member $P_o$.

However, the prior art described above resorts to the snapping function of the pawl walls 23 of the aforementioned socket body 22 due to the forced insertion at the time of connecting the piping member $P_o$. As a result, an annular ridged wall 24' forming a shoulder retained at the stepped portion 24 formed on the annular circumference 23' at the rear end of the socket body 22 has to be made to give a large diameter to the socket body 22, because the ridged wall 24' has to be depressed inward and passed inside of the retaining wall 21' when the socket body 22 is to be assembled. Then, the product is enlarged in its entirety including the connector body 21, thus causing a problem in the arrangement in a narrow place.

SUMMARY OF THE INVENTION

The present invention has been conceived in view of the above-specified problem concomitant with the prior art and has an object to provided a connector for connecting slender piping members, which is made compact in its entirety including the connector body by reducing the diameter of the socket body so that the arrangement may be conveniently made in a narrow place, and which is enabled to easily assemble the socket body itself and to connect and disconnect the piping member.

In order to achieve the above-specified object, according to the present invention, there is provided a connector for connecting slender piping members, which connector comprises: a connector body formed axially therethrough with a stepped smaller-diameter chamber, which is expanded to lead to a communication hole formed in a connecting cylindrical wall at the leading end, and a stepped larger-diameter chamber which is positioned at the back of said smaller-diameter chamber, said connector body being formed with a pair of engagement holes or slots opposed to the circumferential wall of said larger-diameter chamber to form a retaining wall at the circumference of the rear end, said connector body having seal ring members at the side of said smaller-diameter chamber and a bushing member at the back of said seal ring members; and a separate socket body having a pair of elastic pawl walls projected from the circumferential wall of the axial through hole in said larger-diameter chamber and inclined forward opposed to the front portion of the assembly direction, said socket body having its rear end annular circumference retained on said retaining wall, a piping member being formed in the vicinity of its connecting end with an annular ridged wall which is retained elastically by the leading ends of said elastic pawl walls when said piping member is in its connected state, wherein said socket body includes: a cylindrical wall forming the root of said elastic pawl walls; cut-away apertures formed in positions opposed to said engagement holes in the vicinity of the intermediate portion of said cylindrical wall; tongue-shaped walls positioned in said cut-away apertures and leading integrally to said elastic pawl walls and the leading end of said cylindrical wall; and a stepped engagement groove formed backward and having its rear end on said retaining wall.

With the structure thus made according to the present invention, in the socket body, the tongue-shaped walls are positioned in the cut-away apertures formed in the aforementioned cylindrical wall and are integrally projected from the elastic pawl walls. As a result, the socket body can be made to have a small diameter by the radially flexible function. As a result, the product can be made compact in its entirety including the connector body so that the arrangement can be accomplished in a narrow place. Moreover, the assembly of the socket body can be simplified by the inward free flexibility of the tongue-shaped walls by the pressure from the back. At the time of subsequent removal of the piping member, still moreover, the elastic pawl walls can be radially expanded by slightly pushing the tongue-shaped walls from the outside. After the annular ridged wall of the piping member has come out of the elastic pawl walls and slightly moved in the extracting direction, the tongue-shaped walls are allowed to restore their initial positions by interrupting the push of the tongue-shaped walls so that a suitable gap is established between the tongue-shaped walls. As a result, the piping member can be extracted easily without any difficulty.

DETAILED DESCRIPTION OF THE PREFERRED EMBODIMENTS

Figure 1:
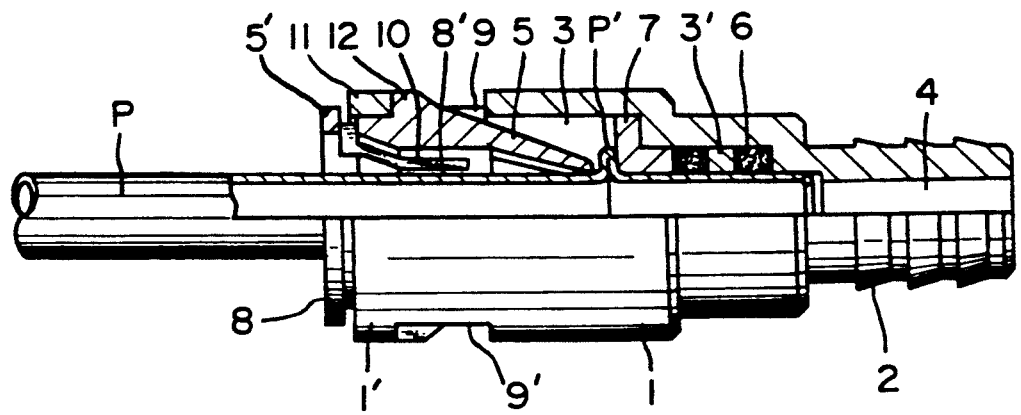
FIG. 1 is a partially cut-away longitudinal section showing the connecting state of a connector for connecting slender piping members according to one embodiment of the present invention.

In FIGS. 1 to 5, reference numeral 1 designates a connector body. This connector body 1 is molded axially therethrough with a stepped smaller-diameter chamber 3', which is expanded to lead to a communication hole 4 defined by a connecting cylindrical wall 2 made of a resin tube or rubber hose (although not shown) at the leading end, and a stepped larger-diameter chamber 3 which is positioned at the back of the smaller-diameter chamber 3'. The circumferential wall defining said larger-diameter chamber 3 of the connector body 1 is formed with a pair of opposed engagement holes or slots 9 and 9' and a retaining wall 1' on the rear end circumference. In the smaller-diameter chamber 3', there are fitted a plurality of elastic seal ring members 6 of rubber through a spacer, if desired, and a bushing member 7 at the back of the seal ring members 6.

Reference numeral 8 designates a socket body of a resin, which to be is assembled in the connector body 1. The socket body 8 is formed with a pair of elastic pawl walls 5, which are projected forward at an inclination from the circumferential wall of the axial through hole and opposed to each other at the front portion in the assembly direction, and an annular circumference 5' at the rear end. A cylindrical wall 8' forming the base of the aforementioned elastic pawl walls 5 is formed in the vicinity of the middle thereof with cut-away apertures 10 which are opposed to the aforementioned engagement holes 9 and 9'. In the cut-away apertures 10, the leading ends of the elastic pawl walls 5 and the cylindrical wall 8' are extended backward together to form tongue-shaped walls 12 which have radially flexible functions. Numeral 11 designates stepped engagement grooves which are formed at the individual rear ends of the tongue-shaped walls 12. A piping member P is connected by elastically retaining its annular ridged wall P', which is formed in the vicinity of the connecting end portion of the piping member P assembled in the connector body 1, on the leading ends of the elastic pawl walls 5 and by retaining the retaining wall 1' in the engagement grooves 11.

Figure 2A:
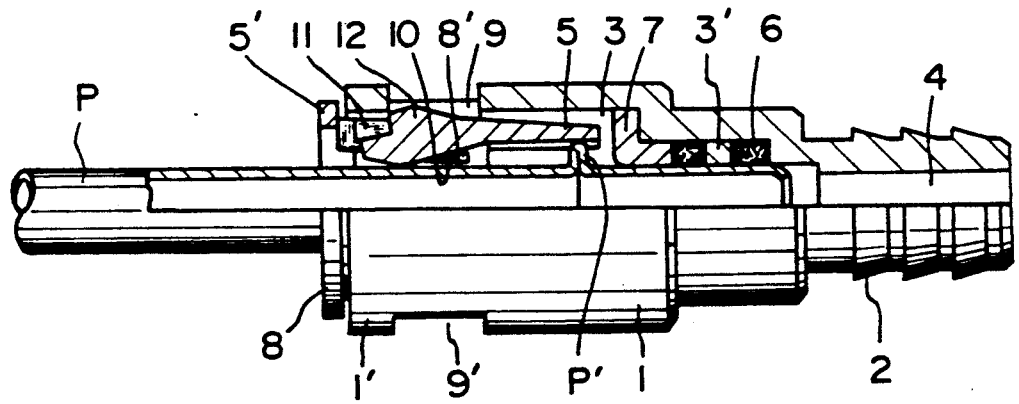
FIGS. 2A and 2B are diagrams for explaining the state in which the piping member of FIG. 1 is removed.
Figure 2B:
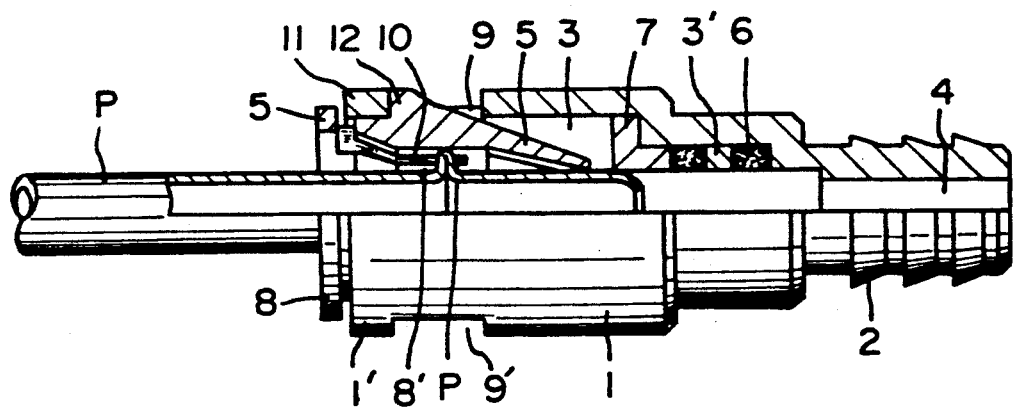
Figure 3:
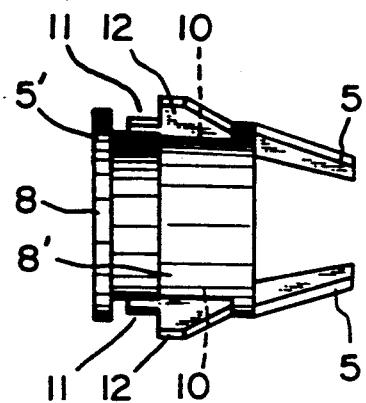
FIG. 3 is a top plan view showing the socket body of FIG. 1 by itself.
Figure 4:
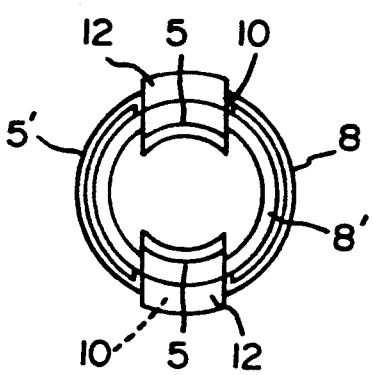
FIG. 4 is a front elevation of FIG. 3.
Figure 5:
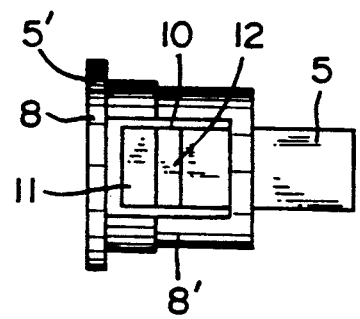
FIG. 5 is a top plan view of FIG. 3.
Figure 6:
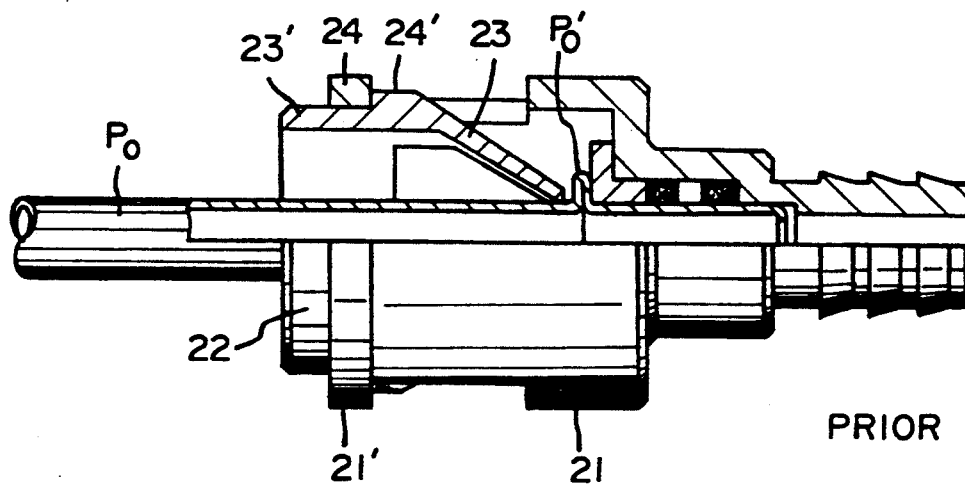
FIG. 6 is a partially cut-away longitudinal section showing the connecting state of the connector of the prior art.

Next, when the piping member P is to be removed, the tongue-shaped walls 12 are pushed radially inwardly, and the elastic pawl walls 5 are radially outwardly expanded to have their leading ends disengaged from the annular ridged wall P' of the piping member P. Then, this piping member P is slightly moved in the extracting direction (as shown in FIG. 2A). Next, the push of the tongue-shaped walls 12 is interrupted, and the piping member P is pulled. Then, the piping member P can be extracted while having its annular ridged wall P' expanding (as shown in FIG. 2B) the inner circumference of the tongue-shaped walls 12.

As has been described hereinbefore, the connector for connecting the slender piping members according to the present invention is constructed such that the socket body 8 is formed at its cylindrical wall 8' forming the base of the elastic pawl walls 5 with the tongue-shaped walls 12 which are positioned in the aforementioned cut-away apertures 10 to lead to said elastic pawl walls, and at its rear end with the engagement grooves 11. As a result, the socket body 8 can be made to have the small diameter by the radially flexible function of the integrated tongue-shaped walls 12. Thus, the product can be made compact in its entirety including the connector body 1 so that it can be arranged even in a narrow place conveniently without difficulty. Moreover, the assembly of the socket body 8 into the connector body 1 can be easily performed by a push from the back. Likewise, the subsequent connection and disconnection of the piping member P can be accomplished simply without difficulty by pushing the tongue-shaped walls 12 slightly from the outside. Thus, it is possible to provide a remarkably useful connector for connecting slender piping members.

I claim:

1. A connector for connecting a slender piping member, said piping member having a connecting end and an annular ridged wall in proximity to the connecting end, said connector comprising:

a connector body having opposed leading and rear ends, a communication hole extending axially into the leading end of the connector body, a circumferential wall extending forwardly from the rear end of the connector body and defining a stepped larger-diameter chamber extending axially into the rear end of the connector body and communicating with said communication hole, a pair of opposed engagement holes formed through the circumferential wall, portions of the circumferential wall rearward of each said engagement hole defining a retaining wall at the rear end of the connector body; and a separate socket body having a generally cylindrical wall with opposed front and rear ends, the front end of the cylindrical wall defining an annular root disposed in the chamber of the connector body, a pair of opposed cut-away apertures defining respective perimeters which extends through the cylindrical wall of the socket body intermediate the front and rear ends thereof and in alignment with the opposed engagement holes of the connector body, tongue-shaped walls extending rearwardly and radially outwardly from the annular root and in alignment with the cut-away apertures in the cylindrical wall of the socket body, said tongue-shaped walls including rear ends disposed respectively in the engagement holes of the connector body and against the retaining wall at the rear end of the connector body for retaining the socket body in the connector body, a pair of pawl walls aligned with the respective tongue-shaped walls and projecting forwardly and radially inwardly from the annular root, the tongue-shaped walls and the pawl walls being pivotable about the annular root at the front end of the cylindrical wall of the socket body such that movement of the tongue-shaped walls radially inwardly generates a radially outward movement of the pawl walls, said tongue-shaped walls and said annular root are encompassed by said perimeter, whereby the pawl walls lockingly engage the annular ridged wall on the piping member to lockingly retain the piping member in the connector body, and whereby radially inward movement of the tongue-shaped walls generates corresponding radially outward movement of the pawl walls for selectively disengaging the piping member from the connector body.

2. A connector according to claim 1, wherein said socket body is made of a resin.

3. A connector according to claim 1, wherein the rear end of each said tongue-shaped wall includes a stepped engagement grove for lockingly engaging the retaining wall of the connector body.

4. A connector according to claim 1, wherein the tongue-shaped walls are disposed entirely forwardly of the rear end of the connector body.

5. A connector according to claim 1, wherein the circumferential wall of the connector body defines an outer diameter, the tongue-shaped walls of the socket body defining an outer diameter no greater than the outer diameter of the circumferential wall of the connector body.

6. A connector according to claim 5, wherein the rear end of the socket body defines an outer diameter less than the outer diameter of the circumferential wall of the connector body.

* * * * *